(12) United States Patent
Kajikawa et al.

(10) Patent No.: US 10,965,193 B2
(45) Date of Patent: Mar. 30, 2021

(54) MOTOR WITH SHAFT FLANGE THROUGH-HOLE FILLED WITH RESIN

(71) Applicant: Nidec Corporation, Kyoto (JP)

(72) Inventors: Satoshi Kajikawa, Kyoto (JP); Yusuke Makino, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 74 days.

(21) Appl. No.: 16/321,514

(22) PCT Filed: Aug. 4, 2017

(86) PCT No.: PCT/JP2017/028368
§ 371 (c)(1),
(2) Date: Jan. 29, 2019

(87) PCT Pub. No.: WO2018/025987
PCT Pub. Date: Feb. 8, 2018

(65) Prior Publication Data
US 2019/0181722 A1    Jun. 13, 2019

Related U.S. Application Data

(60) Provisional application No. 62/371,342, filed on Aug. 5, 2016.

(30) Foreign Application Priority Data

Mar. 6, 2017   (JP) .............................. JP2017-041573

(51) Int. Cl.
*H02K 9/06*       (2006.01)
*B64D 1/00*       (2006.01)
(Continued)

(52) U.S. Cl.
CPC ................. *H02K 9/06* (2013.01); *B64D 1/00* (2013.01); *H02K 1/27* (2013.01); *H02K 1/2786* (2013.01);
(Continued)

(58) Field of Classification Search
CPC .. H02K 9/00; H02K 9/02; H02K 9/04; H02K 9/06; H02K 9/08; H02K 9/12; H02K 9/14;
(Continued)

(56) References Cited

U.S. PATENT DOCUMENTS 4,883,982 A * 11/1989 Forbes .................... F04D 25/08
                                                       310/62
5,944,497 A *  8/1999 Kershaw ............... F04D 25/082
                                                       417/368
(Continued)

FOREIGN PATENT DOCUMENTS

JP           05-2573 U      1/1993
JP         09-294345 A     11/1997
(Continued)

OTHER PUBLICATIONS

JP2005337340 English Translation.*
(Continued)

*Primary Examiner* — Maged M Almawri
(74) *Attorney, Agent, or Firm* — Keating & Bennett

(57) ABSTRACT

A motor includes a shaft centered on a center axis oriented in a vertical direction, a bearing rotatably supporting the shaft, an armature disposed radially outward of the bearing, a bracket to which the bearing and the armature are fixed, and a covered cylindrical rotor connected to the shaft. The rotor includes a disk-shaped rotor lid portion connected to the shaft, and a rotor side wall portion extending downward from an outer edge of the rotor lid portion. The shaft is made of metal. The rotor lid portion and the rotor side wall portion are made of resin. The rotor lid portion and the shaft are an integrally molded article.

4 Claims, 9 Drawing Sheets

(51) Int. Cl.
  *H02K 1/27*      (2006.01)
  *H02K 1/28*      (2006.01)
  *H02K 11/33*     (2016.01)
  *H02K 5/173*     (2006.01)
  *H02K 11/215*    (2016.01)
  *H02K 5/20*      (2006.01)
  *H02K 5/22*      (2006.01)
  *H02K 7/00*      (2006.01)
  *H02K 7/08*      (2006.01)
  *H02K 21/22*     (2006.01)

(52) U.S. Cl.
  CPC ............ *H02K 1/28* (2013.01); *H02K 5/1735* (2013.01); *H02K 5/20* (2013.01); *H02K 5/225* (2013.01); *H02K 7/003* (2013.01); *H02K 7/085* (2013.01); *H02K 11/215* (2016.01); *H02K 11/33* (2016.01); *H02K 21/22* (2013.01); *H02K 2211/03* (2013.01)

(58) Field of Classification Search
  CPC .......... H02K 9/16; H02K 1/27; H02K 1/2786; H02K 1/28; H02K 1/32; H02K 11/215; H02K 11/33; H02K 5/1735; H02K 5/20; H02K 5/225; H02K 7/003; H02K 7/085; H02K 21/22; H02K 2211/03; H02K 1/00; H02K 29/08
  USPC ..... 360/99; 219/678; 310/54–89, 58, 61, 59, 310/60 R, 68, 67, 64, 67 R, 40 MM, 90
  See application file for complete search history.

(56) References Cited

U.S. PATENT DOCUMENTS

| | | | | |
|---|---|---|---|---|
| 6,384,494 | B1* | 5/2002 | Avidano ............. | H02K 9/06 310/58 |
| 7,166,940 | B2* | 1/2007 | Ewert ............... | F04D 25/0613 310/261.1 |
| 7,244,110 | B2* | 7/2007 | Hong ................ | F04D 25/082 310/62 |
| 7,585,159 | B2* | 9/2009 | Caplan .............. | H02K 9/06 417/368 |
| 7,598,634 | B2* | 10/2009 | Izumi ............... | F04D 25/0613 310/58 |
| 8,251,676 | B2* | 8/2012 | Fleischmann ........ | F04D 25/082 310/62 |
| 8,461,731 | B2* | 6/2013 | Fish ................ | H02K 5/20 310/58 |
| 10,107,301 | B2* | 10/2018 | Evers .............. | H02K 9/06 |
| 10,253,676 | B2* | 4/2019 | Gossling ........... | F01P 1/06 |
| 10,550,847 | B2* | 2/2020 | Berroth ............ | F04D 29/281 |
| 2006/0119195 | A1* | 6/2006 | Liu ................. | F04D 25/082 310/62 |
| 2009/0256441 | A1* | 10/2009 | Horng .............. | H02K 7/085 310/90 |
| 2013/0009494 | A1* | 1/2013 | Oguma ............. | F04D 25/064 310/43 |
| 2013/0200738 | A1* | 8/2013 | Horng .............. | H02K 5/1735 310/90 |
| 2013/0216376 | A1* | 8/2013 | Nicgorski .......... | H02K 7/14 415/220 |

FOREIGN PATENT DOCUMENTS

| | | | |
|---|---|---|---|
| JP | 2001-244110 A | | 9/2001 |
| JP | 2004-263710 A | | 9/2004 |
| JP | 2005337340 | * | 3/2005 |
| JP | 2016-103949 A | | 6/2016 |

OTHER PUBLICATIONS

JP2004263710A English Translation.*
JPH09294345 English Translation.*
Makino, "Motor", U.S. Appl. No. 16/321,510, filed Jan. 29, 2019.
Kajikawa et al., "Motor and Axial Fan", U.S. Appl. No. 16/321,511, filed Jan. 29, 2019.
Kajikawa et al., "Motor", U.S. Appl. No. 16/321,512, filed Jan. 29, 2019.
Makino, "Motor", U.S. Appl. No. 16/321,513, filed Jan. 29, 2019.
Ueda et al., "Stator Core and Motor", U.S. Appl. No. 16/321,516, filed Jan. 29, 2019.
Makino, "Motor", U.S. Appl. No. 16/321,517, filed Jan. 29, 2019.
Official Communication issued in International Patent Application No. PCT/JP2017/028368, dated Nov. 21, 2017.

* cited by examiner

MOTOR WITH SHAFT FLANGE THROUGH-HOLE FILLED WITH RESIN

BACKGROUND OF THE INVENTION

1. Field of the Invention

The present disclosure relates to a motor.

2. Description of the Related Art

In general, an axial flow fan has been used as an engine cooling fan or the like, which sends air in an axial direction by an impeller attached to a rotating portion of a motor. However, a motor used in, for example, the axial flow fan is desirably expected to have a secure fixture between a rotor and a shaft, and to be lightweight.

SUMMARY OF THE INVENTION

An exemplified embodiment of the present disclosure is a motor, which includes a shaft centered on a center axis oriented in a vertical direction; a bearing rotatably supporting the shaft; an armature disposed radially outward of the bearing; a bracket to which the bearing and the armature are fixed; and a covered cylindrical rotor connected to the shaft. The rotor includes a disk-shaped rotor lid portion connected to the shaft, and a rotor side wall portion extending downward from an outer edge of the rotor lid portion. The shaft is made of metal. The rotor lid portion and the rotor side wall portion are made of resin. The rotor lid portion and the shaft are an integrally molded article.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
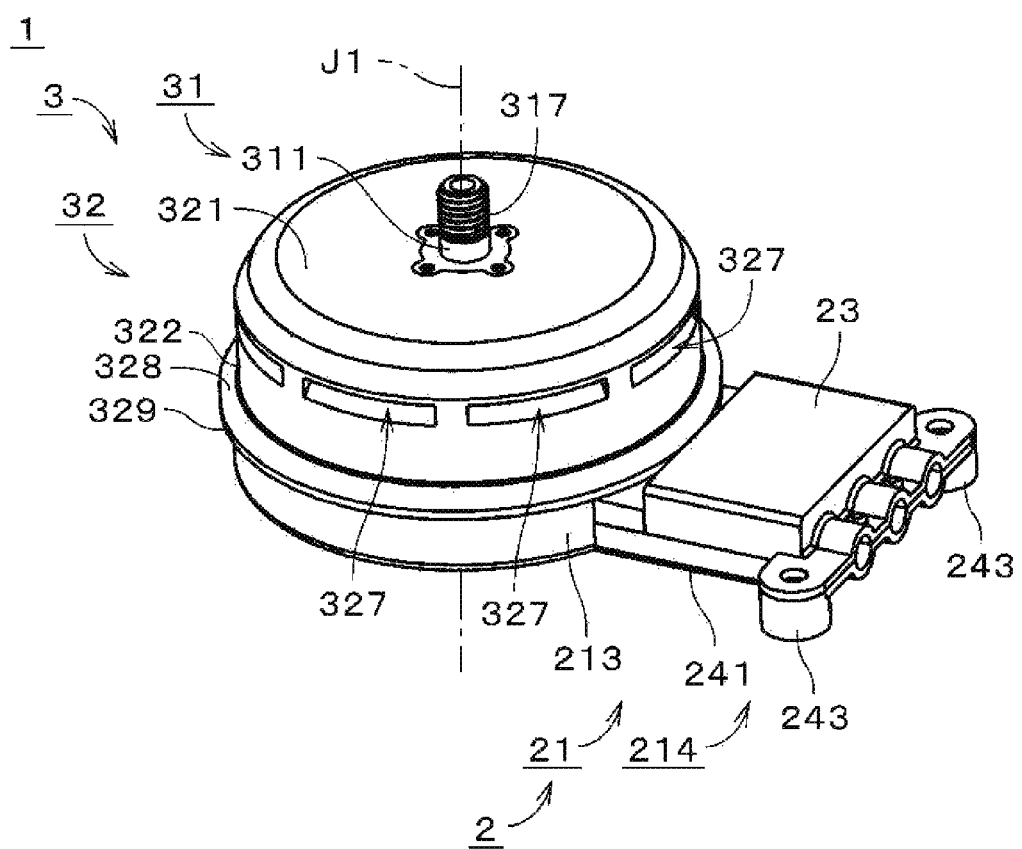
FIG. 1 is a perspective view of a motor according to an exemplified embodiment of the present disclosure.
Figure 2:
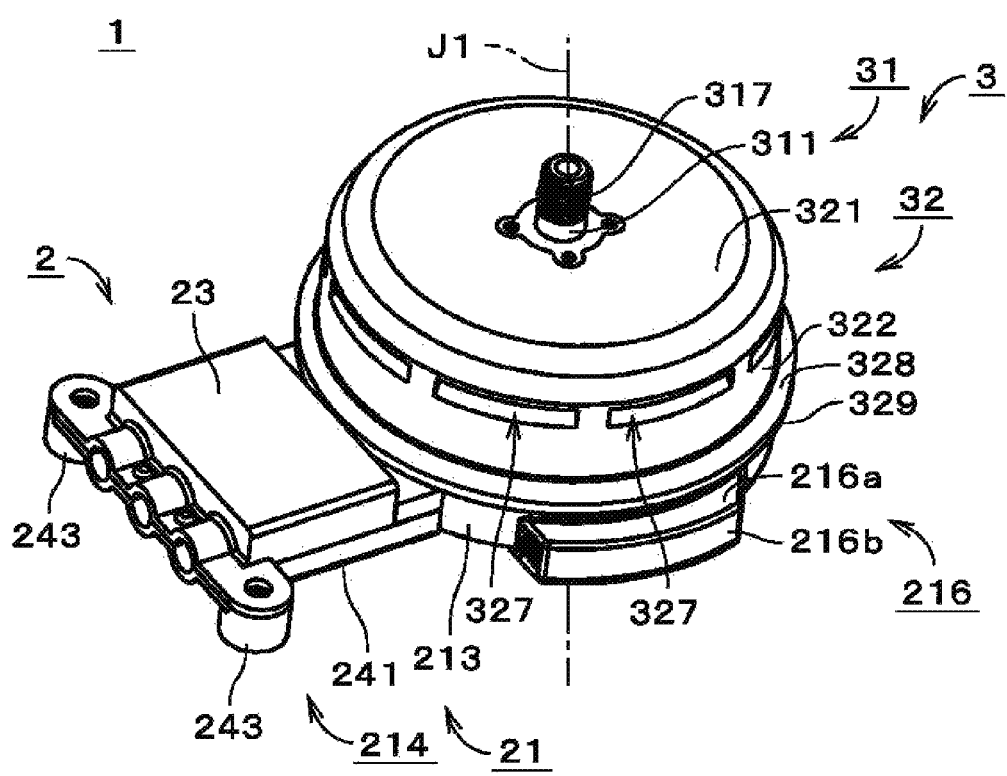
FIG. 2 is a perspective view of the motor.
Figure 3:
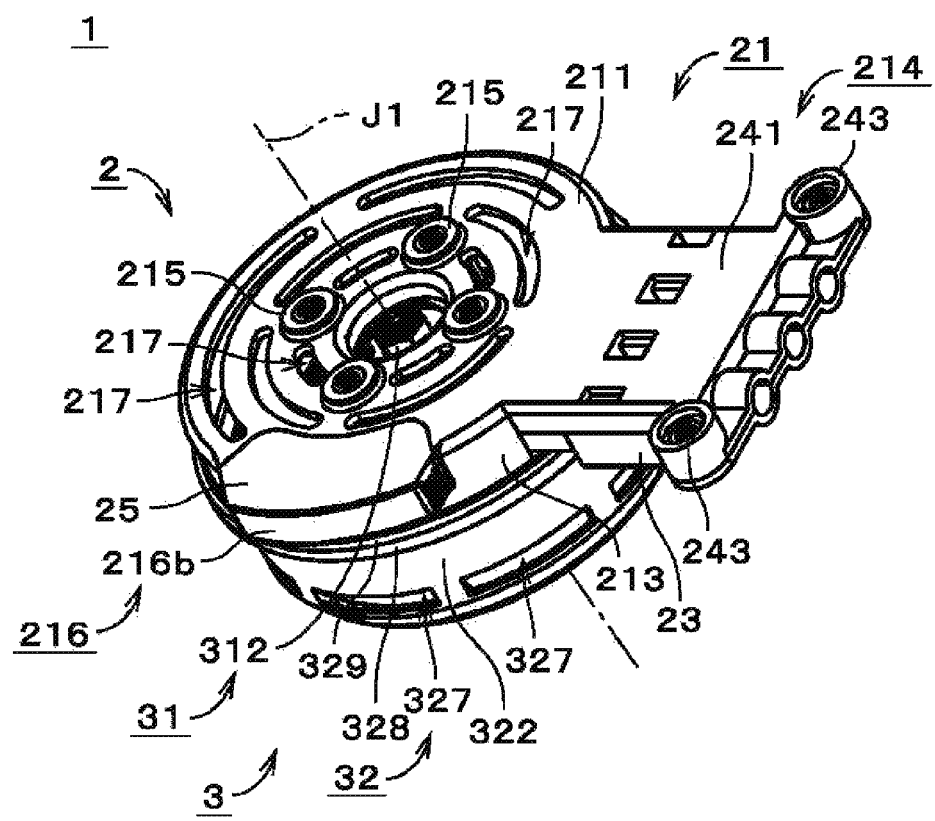
FIG. 3 is a perspective view of the motor.
Figure 4:
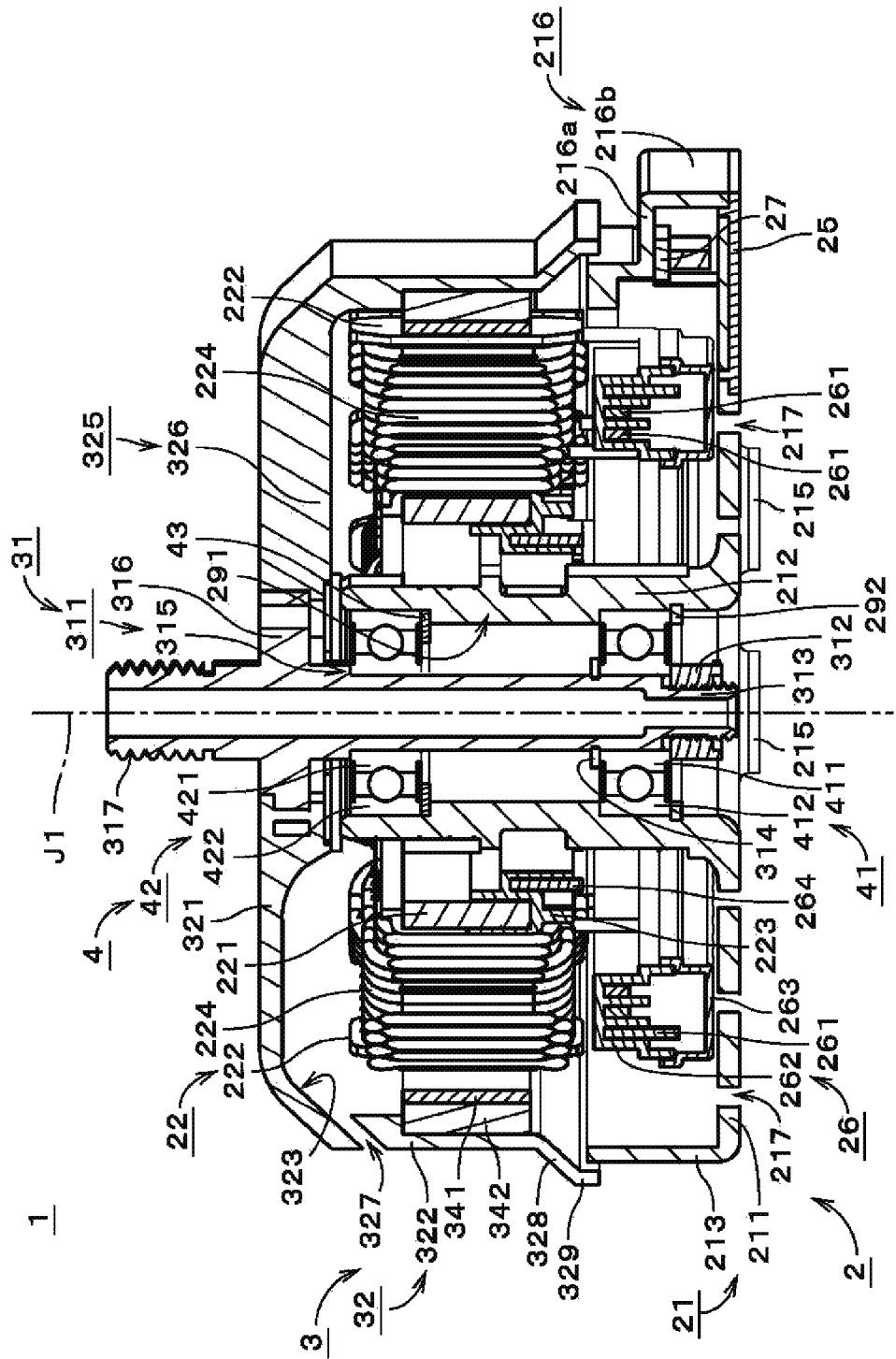
FIG. 4 is a longitudinal cross-sectional view of the motor.

FIG. 1 is a perspective view showing an appearance of a motor 1 according to one exemplary embodiment of the present disclosure. The motor 1 is an external rotor brushless motor. The motor 1 is used to, for example, rotate an impeller in an axial flow fan. FIGS. 2 and 3 are perspective views of the motor 1 as viewed from directions different from that of FIG. 1. FIG. 4 is a longitudinal cross-sectional view of the motor 1. Parallel slanting lines in the detailed cross-section are omitted in FIG. 4. Moreover, a configuration on a far side from the cross-section and a partial outer surface of the motor are also drawn in FIG. 4.

In this specification, an upper side and a lower side in a direction of a center axis J1 of the motor 1 in FIG. 4 are simply referred to as an "upper side" and a "lower side", respectively. The upper and lower sides in this specification do not indicate upper and lower sides in a gravity direction when installed into the actual equipment. Hereinafter, a peripheral direction around the center axis J1 is simply referred to as a "peripheral direction", and a radial direction around the center axis J1 is simply referred to as a "radial direction." Moreover, a direction parallel to the center axis J1 is referred to as a "vertical direction" or an "axial direction."

The motor 1 includes a stationary portion 2, a rotating portion 3, and a bearing mechanism 4. The bearing mechanism 4 rotatably supports the rotating portion 3 with respect to the stationary portion 2. The stationary portion 2 includes a bracket 21, an armature 22, a terminal cover portion 23, a circuit board 27, a board cover portion 25, and a bus bar unit 26. The rotating portion 3 includes a shaft 31 and a rotor 32. The bearing mechanism 4 includes a lower ball bearing 41 and an upper ball bearing 42.

Figure 5:
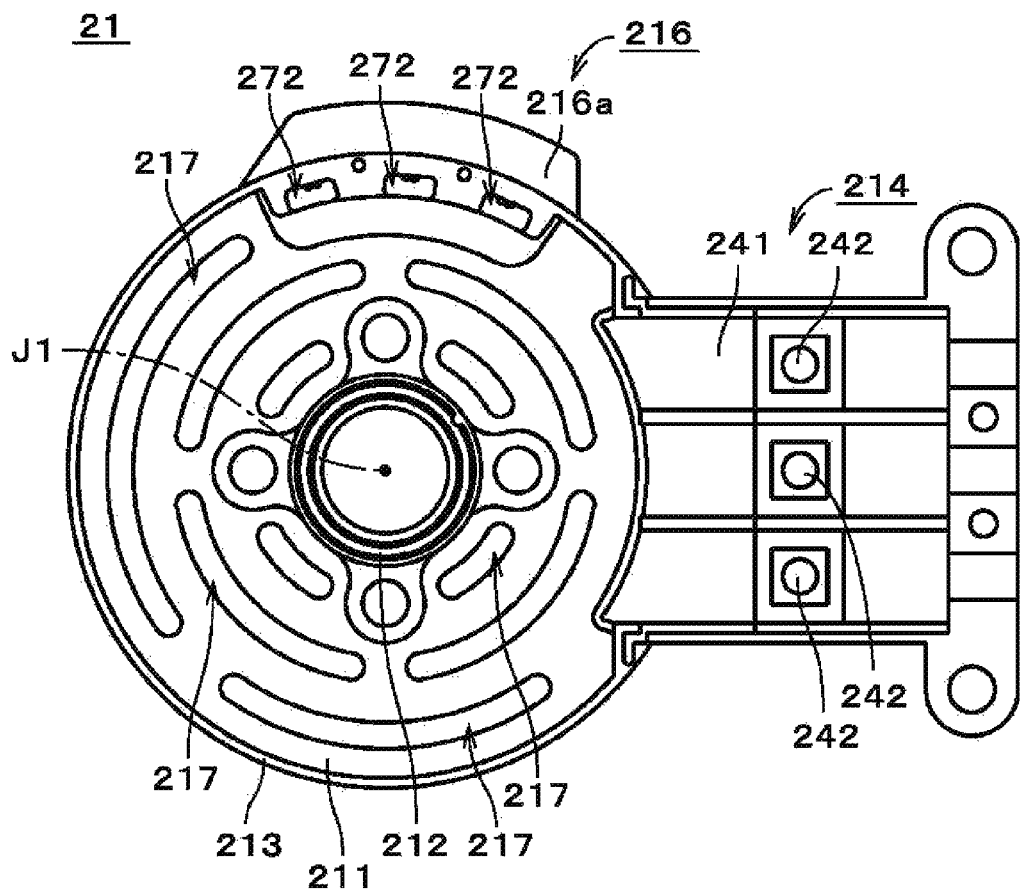
FIG. 5 is a plan view of a bracket.
Figure 6:
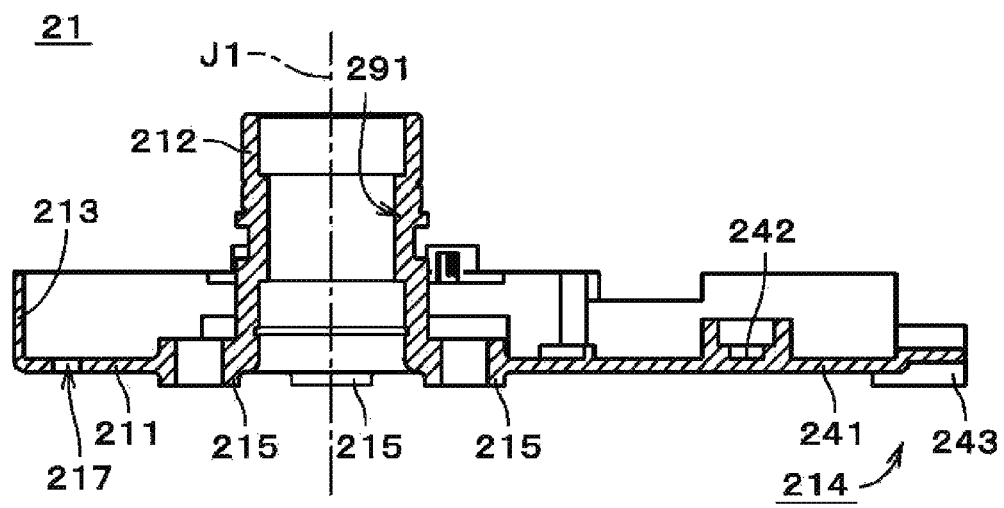
FIG. 6 is a longitudinal cross-sectional view of the bracket.
Figure 7:
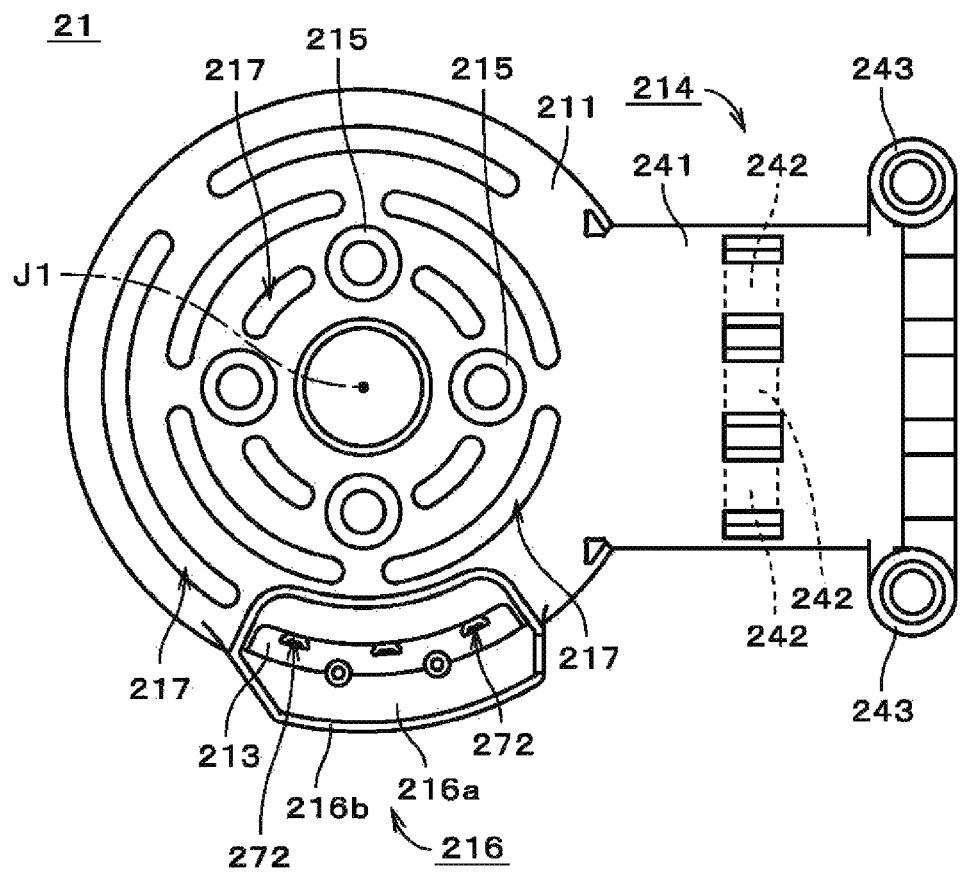
FIG. 7 is a bottom view of the bracket.
Figure 8:
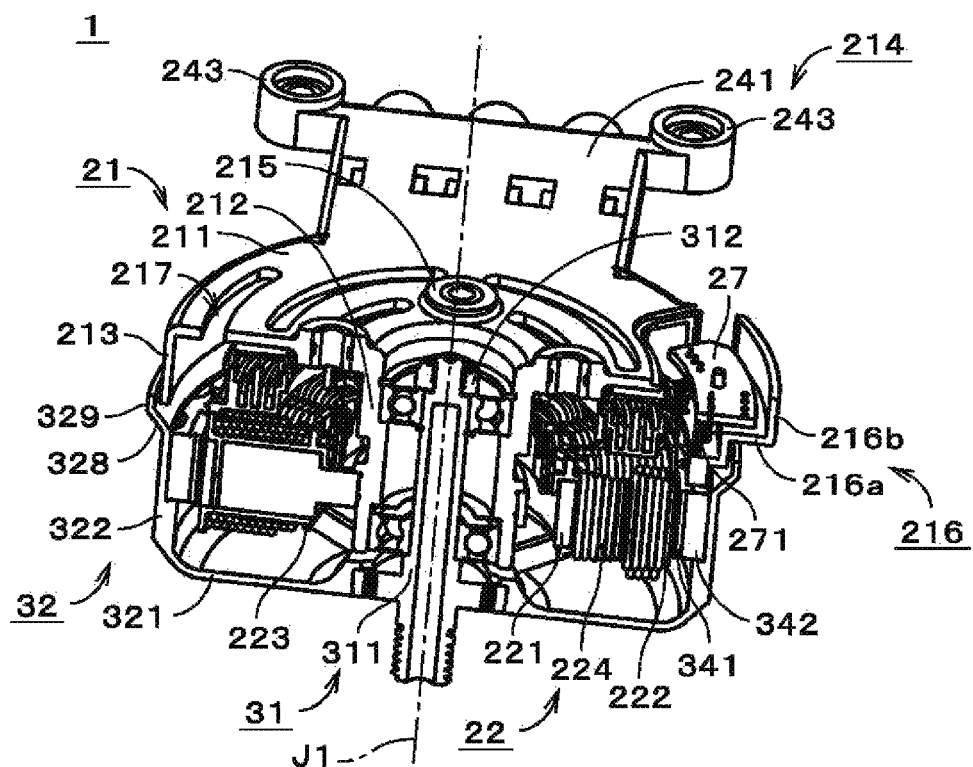
FIG. 8 is a perspective cross-sectional view of the motor.

FIG. 5 is a plan view of the bracket 21. FIG. 6 is a longitudinal cross-sectional view of the bracket 21. FIG. 7 is a bottom view of the bracket 21. FIG. 8 is a perspective cross-sectional view of the motor 1. FIG. 8 shows the bracket 21, the circuit board 27 and the like as viewed diagonally from below. The board cover portion 25 is omitted in FIGS. 7 and 8.

The bracket 21 includes a bracket bottom portion 211, a cylindrical portion 212, and a bracket side wall portion 213. The bracket bottom portion 211, the cylindrical portion 212 and the bracket side wall portion 213 are a single member made of resin. The cylindrical portion 212 is a substantially cylindrical portion centered on the center axis J1 oriented in the vertical direction. The bracket bottom portion 211 is a plate-like portion substantially perpendicular to the center axis J1. The bracket bottom portion 211 extends radially outward from a lower end portion of the cylindrical portion 212. In other words, the cylindrical portion 212 extends upward from the bracket bottom portion 211. The bracket bottom portion 211 is substantially annular with the center axis J1 as a center in a plan view.

The bracket side wall portion 213 extends upward from an outer peripheral portion of the bracket bottom portion 211. The bracket side wall portion 213 is disposed radially outward of the cylindrical portion 212. The bracket side wall portion 213 lacks a portion in the peripheral direction of the substantially cylindrical portion centered on the center axis J1. In a plan view, the bracket side wall portion 213 is a substantially circular arc such as a C shape.

As shown in FIG. 4, the bearing mechanism 4 is fixed to an inner peripheral surface of the cylindrical portion 212 of the bracket 21. In particular, the lower ball bearing 41 of the bearing mechanism 4 is fixed to an inner peripheral surface of a lower portion of the cylindrical portion 212. Moreover, the upper ball bearing 42 is fixed to an inner peripheral surface of an upper portion of the cylindrical portion 212. Hereinafter, a portion between an upper surface of the lower ball bearing 41 and a lower surface of the upper ball bearing 42, of the cylindrical portion 212, is referred to as a "cylindrical center portion 291."

An inner diameter of the cylindrical center portion 291 is smaller than an inner diameter of a portion in contact with the lower ball bearing 41, of the cylindrical portion 212, and smaller than an outer diameter of the lower ball bearing 41.

Moreover, the inner diameter of the cylindrical center portion 291 is smaller than an inner diameter of a portion in contact with the upper ball bearing 42, of the cylindrical portion 212, and smaller than an outer diameter of the upper ball bearing 42. In other words, the cylindrical center portion 291 is a small diameter portion projecting radially inward from portions on lower and upper sides of the cylindrical center portion 291. The cylindrical center portion 291 is a portion connected to the portions on the lower and upper sides of the cylindrical center portion 291.

The armature 22 is fixed to an outer peripheral surface of the cylindrical portion 212 of the bracket 21. The armature 22 is disposed radially outward of the bearing mechanism 4. A lower side of the armature 22 is covered by the bracket bottom portion 211. The armature 22 is electrically connected to the bus bar unit 26. The armature 22 is electrically connected to an external power supply (not shown) via the bus bar unit 26 and a terminal 242 (described later).

The armature 22 includes a core back portion 221, a plurality of teeth 222, an insulator 223, and a plurality of coils 224. The core back portion 221 is an annular portion centered on the center axis J1. The core back portion 221 is fixed to the outer peripheral surface of the cylindrical portion 212 of the bracket 21. The plurality of teeth 222 eradiate radially outward from the core back portion 221. The plurality of teeth 222 are arranged at substantially equal angular intervals in the peripheral direction. The core back portion 221 and the plurality of teeth 222 are, for example, a single member made of metal. The insulator 223 is an insulator covering surfaces of the plurality of teeth 222. The plurality of coils 224 are formed by winding a conductive wire from above the insulator 223 to the plurality of teeth 222. In this embodiment, the plurality of coils 224 are three-phase coils.

The bus bar unit 26 includes a plurality of bus bars 261, a bus bar holding portion 262, and a bus bar cover portion 263. The bus bar unit 26 is a substantially arcuate or annular member, which is centered on the center axis J1. The bus bar unit 26 is disposed vertically below the armature 22. The plurality of coils 224 are electrically connected to the plurality of bus bars 261. Each bus bar 261 is a conductive member. Each bus bar 261 is a substantially arcuate or annular member, which is centered on the center axis J1.

In the example illustrated in FIG. 4, there are three bus bars 261. The plurality of bus bars 261 include a U-phase bus bar, a V-phase bus bar, and a W-phase bus bar. The U-phase bus bar connects a plurality of U-phase coils 224 out of the plurality of the coils 224 to each other. The V-phase bus bar connects a plurality of V-phase coils 224 out of the plurality of the coils 224 to each other. The W-phase bus bar connects a plurality of W-phase coils 224 out of the plurality of the coils 224 to each other.

The bus bar holding portion 262 holds the plurality of bus bars 261. The bus bar holding portion 262 is an insulating member. The bus bar holding portion 262 is a substantially arcuate or annular member, which is centered on the center axis J1. The bus bar holding portion 262 includes a canopy portion, an inner wall portion and an outer wall portion, and is opened downward. The canopy portion of the bus bar holding portion 262 is disposed at and fixed to a lower surface of the insulator 223. Thereby, the bus bar unit 26 is disposed with respect to the armature 22. The plurality of bus bars 261 are accommodated in an internal space of the bus bar holding portion 262. Each bus bar 261 is fixed to a groove provided on a lower surface of the canopy portion of the bus bar holding portion 262.

The bus bar cover portion 263 is attached to a lower end portion of the bus bar holding portion 262 and blocks a lower opening of the bus bar holding portion 262. Thereby, at least a part of the plurality of bus bars 261 within the bus bar holding portion 262 is covered from the lower side by the bus bar cover portion 263. It is preferable that whole of the plurality of bus bars 261 are covered from the lower side by the bus bar cover portion 263. In this embodiment, the bus bar holding portion 262 and the bus bar cover portion 263 constitute a bus bar case. The plurality of bus bars 261 are accommodated in an internal space of the bus bar case. The internal space of the bus bar case is preferably an enclosed space isolated from the outside. The bus bar cover portion 263 is an insulating member. In the motor 1, the internal space of the bus bar case, that is, a region surrounded by the bus bar holding portion 262 and the bus bar cover portion 263 may be filled with resin. In other words, the plurality of bus bars 261 within the bus bar case may be molded with resin.

The bus bar unit 26 further includes a neutral point bus bar 264. The neutral point bus bar 264 connects neutral points of the plurality of coils 224. The neutral point bus bar 264 is a conductive member. The neutral point bus bar 264 is a substantially arcuate or annular member, which is centered on the center axis J1. In the example illustrated in FIG. 4, the neutral point bus bar 264 is not held by the bus bar holding portion 262 but disposed outside the bus bar case. In particular, the neutral point bus bar 264 is held by the insulator 223 radially inward of the core back portion 221.

The bracket 21 further includes a terminal holding portion 214. The terminal holding portion 214 extends radially outward from the outer peripheral portion of the bracket bottom portion 211. In particular, the terminal holding portion 214 extends radially outward from a portion at which the bracket side wall portion 213 is not formed, of the outer peripheral portion of the bracket bottom portion 211. The terminal holding portion 214 is a plate-like portion substantially perpendicular to the center axis J1. The terminal holding portion 214 is substantially rectangular in a plan view. The terminal holding portion 214 is covered from the upper side by the terminal cover portion 23. The terminal cover portion 23 has a substantially rectangular shape with approximately the same size as that of the terminal holding portion 214 in a plan view.

The terminal holding portion 214 includes a holding portion main body 241, a terminal 242, and a protrusion portion 243. The holding portion main body 241 is a plate-like member connected to the outer peripheral portion of the bracket bottom portion 211. The holding portion main body 241 and the bracket bottom portion 211 are a single member made of resin. The terminal 242 is disposed on an upper surface of the holding portion main body 241. In the example illustrated in FIG. 5, three terminals 242 are provided on the holding portion main body 241. The three bus bars 261 (described above) are electrically connected to the three terminals 242, respectively. Moreover, a lead wire (not shown) from the external power supply is electrically connected to each terminal 242. The lead wire is fixed to the terminal 242 by, for example, fastening a screw of the terminal 242.

The protrusion portion 243 projects downward from a lower surface of the holding portion main body 241. Hereinafter, the protrusion portion 243 is referred to as a "holding protrusion portion 243." The holding protrusion portion 243 is disposed radially outward of the terminal 242, or disposed at substantially the same position in the radial direction as that of the terminal 242. In the examples illustrated in FIGS.

6 and 7, two holding protrusion portions 243 are disposed radially outward of the terminal 242, and disposed at end portions radially outward of the holding portion main body 241. In the other words, the holding protrusion portion 243 is disposed at an end portion furthest away from the bracket bottom portion 211 in the radial direction, of the holding portion main body 241. Two holding protrusion portions 243 are disposed at both end portions of the holding portion main body 241 in the peripheral direction. Each holding protrusion portion 243 is thicker than a portion surrounding the holding protrusion portion 243, of the terminal holding portion 214.

Each holding protrusion portion 243 is a substantially cylindrical portion that opens downward. A nut (not shown) is disposed inside each holding protrusion portion 243. Two bolts (not shown) penetrating the terminal cover portion 23 from the upper side are screwed to the nuts in the two holding protrusion portions 243, whereby the terminal cover portion 23 is fixed to the terminal holding portion 214. The number of the holding protrusion portions 243 provided in the terminal holding portion 214 may be appropriately tailored. For example, the terminal holding portion 214 may include one, or three or more holding protrusion portions 243.

The bracket 21 further includes a bracket protrusion portion 215. The bracket protrusion portion 215 projects downward from the lower surface of the bracket bottom portion 211. In the examples illustrated in FIGS. 6 and 7, four bracket protrusion portions 215 are disposed radially outward of the outer peripheral surface of the cylindrical portion 212. The four bracket protrusion portions 215 are arranged on substantially concentric circles at substantially equal angular intervals. Each bracket protrusion portion 215 is a substantially cylindrical portion that opens downward. An internal space of the bracket protrusion portion 215 is a part of a through-hole vertically penetrating the bracket bottom portion 211. The bracket protrusion portion 215 is used to, for example, attach the motor 1 to a target equipment. A lower end of each bracket protrusion portion 215 is disposed at substantially the same position in the vertical direction as that of a lower end of each holding protrusion portion 243 of the terminal holding portion 214. The number of the bracket protrusion portions 215 provided in the bracket 21 may be appropriately tailored. For example, the bracket 21 may include one or more bracket protrusion portions 215.

The bracket 21 further includes a board holding portion 216. The board holding portion 216 is connected to the bracket side wall portion 213. The board holding portion 216 projects radially outward from the bracket side wall portion 213. The board holding portion 216 is connected to the bracket side wall portion 213 at a position different from the terminal holding portion 214 in the peripheral direction. In the examples illustrated FIGS. 5 and 7, the board holding portion 216 is disposed at a position shifted from the terminal holding portion 214 by about 90 degrees in the peripheral direction. The board holding portion 216 is made of, for example, resin. The board holding portion 216 is a single member connected to the bracket side wall portion 213.

The board holding portion 216 includes a first portion 216a and a second portion 216b. The first portion 216a is a substantially flat plate-like portion substantially perpendicular to the center axis J1. The first portion 216a extends radially outward from the bracket side wall portion 213. The second portion 216b extends downward from a radially outer edge of the first portion 216a. In other words, the board holding portion 216 opens downward.

The circuit board 27 is held by the board holding portion 216. In the example illustrated in FIG. 8, the circuit board 27 is disposed below the first portion 216a of the board holding portion 216, and is fixed to a lower surface of the first portion 216a. The second portion 216b of the board holding portion 216 is disposed radially outward of the circuit board 27. The circuit board 27 is disposed radially outward of the armature 22 and the bus bar unit 26.

A Hall element 271 is mounted on the circuit board 27. The Hall element 271 is a magnetic sensor using the Hall effect, and is used for detecting a position of a rotor magnet 341 (described later). The Hall element in this specification is a concept encompassing not only a single Hall element but also a Hall IC using the Hall element. In this embodiment, three Hall elements 271 are mounted on an upper surface of the circuit board via the lead wire. Furthermore, the circuit board 27 is provided with a communication unit (not shown) for wireless communication. The communication unit is, for example, a microcomputer.

The Hall element 271 is held by the bracket side wall portion 213. In the examples illustrated in FIGS. 5, 7 and 8, three Hall elements 271 are inserted from the lower side into three element attachment holes 272, which are provided on the bracket side wall portion 213, at positions separated upward from the circuit board 27. Three Hall elements 271 are arranged at substantially equal angular intervals in the peripheral direction. In the example illustrated in FIG. 8, each Hall element 271 is disposed lower than the rotor magnet 341. In other words, each Hall element 271 is disposed, below the rotor magnet 341, at approximately the same position in the radial direction as that of the rotor magnet 341. Furthermore, in other words, each Hall element 271 is disposed at a position overlapping the rotor magnet 341 in the vertical direction, and is vertically opposed to a lower surface of the rotor magnet 341.

As shown in FIG. 3, the board cover portion 25 is attached at a lower end portion of the board holding portion 216 of the bracket 21. The board cover portion 25 is detachably attached to the board holding portion 216 and the bracket bottom portion 211. The board cover portion 25 is attached to the bracket 21 by, for example, a snap-fit structure. The board cover portion 25 covers the circuit board 27 and the board holding portion 216 from the lower side. The board cover portion 25 is preferably made of resin.

The shaft 31 is a substantially columnar or cylindrical member, which is centered on the center axis J1. The shaft 31 is made of, for example, metal. The shaft 31 is formed by, for example, an aluminum alloy. As shown in FIG. 4, the shaft 31 is rotatably supported by the bearing mechanism 4. In particular, the lower ball bearing 41 of the bearing mechanism 4 supports a lower portion of the shaft 31. The upper ball bearing 42 is disposed higher than the lower ball bearing 41 and supports the shaft 31.

The shaft 31 includes a shaft main body 311 and a nut 312. The shaft main body 311 is a substantially columnar or cylindrical member, which is centered on the center axis J1. In the example illustrated in FIG. 4, the shaft main body 311 is a substantially cylindrical hollow shaft. A male screw portion 313 is provided at a lower end portion of the shaft main body 311. The male screw portion 313 has an outer diameter smaller than an inner diameter of the lower ball bearing 41. Moreover, the outer diameter of the male screw portion 313 is also smaller than an outer diameter of a portion on an upper side of the male screw portion 313, of the shaft main body 311. A lower surface of the portion on the upper side of the male screw portion 313 is disposed at the same position in the vertical direction as that of an upper end of the male screw portion 313. In other words, the shaft main body 311 is provided with a stepped portion extending radially outward at the upper end of the male screw portion 313. The male screw portion 313 projects downward from the lower ball bearing 41. A lower surface of an inner ring 411 of the lower ball bearing 41 is disposed lower than the upper end of the male screw portion 313. Furthermore, the lower surface of the inner ring 411 of the lower ball bearing 41 may be disposed at substantially the same position in the vertical direction as that of the upper end of the male screw portion 313.

The nut 312 is attached to the male screw portion 313 from a lower side of the shaft main body 311. The male screw portion 313 is preferably threaded in a direction that the male screw portion 313 is not loosened in accordance with a rotation direction of the shaft 31. For example, the male screw portion 313 is threaded to the right when the rotation direction of the shaft 31 is clockwise as viewed from the axially upper side. The nut 312 is preferably a locking nut having a locking structure. However, a nut other than the locking nut may be used as the nut 312.

The lower surface of the inner ring 411 of the lower ball bearing 41 is in contact with an upper surface of the nut 312. The upper surface of the nut 312 is disposed lower than the upper end of the male screw portion 313. An upper surface of the inner ring 411 of the lower ball bearing 41 is in contact with a lower surface of a lower shaft protrusion 314 of the shaft main body 311. Therefore, the inner ring 411 of the lower ball bearing 41 is sandwiched between the nut 312 and the lower shaft protrusion 314. The lower shaft protrusion 314 projects radially outward of an inner peripheral edge of the lower ball bearing 41, on an upper side of the lower ball bearing 41. In the example illustrated in FIG. 4, the lower shaft protrusion 314 is a C-ring attached to a portion radially inward of the lower shaft protrusion 314, of the shaft main body 311. Moreover, the lower shaft protrusion 314 may be a stepped portion connected to a portion surrounding the lower shaft protrusion 314, of the shaft main body 311. Alternatively, a substantially cylindrical collar, which is a member different from the shaft main body 311, may be fixed to an outer peripheral surface of the shaft main body 311 to serve as the lower shaft protrusion 314. The collar is made of, for example, metal or resin.

An upper surface of an outer ring 412 of the lower ball bearing 41 is in contact with a lower surface of the cylindrical center portion 291. Therefore, the upper surface of the outer ring 412 of the lower ball bearing 41 is vertically supported by the cylindrical portion 212. A lower surface of the outer ring 412 of the lower ball bearing 41 is in contact with an upper surface of a lower bracket protrusion 292 of the cylindrical portion 212. That is, the outer ring 412 of the lower ball bearing 41 is sandwiched between the lower bracket protrusion 292 and the cylindrical center portion 291. The lower bracket protrusion 292 projects radially outward of an outer peripheral edge of the lower ball bearing 41, on a lower side of the lower ball bearing 41. In the example illustrated in FIG. 4, the lower bracket protrusion 292 is a C-ring attached to a portion radially outward of the lower bracket protrusion 292, of the cylindrical portion 212. Moreover, the lower bracket protrusion 292 may be a stepped portion connected to a portion surrounding the lower bracket protrusion 292, of the cylindrical portion 212.

An upper surface of an inner ring 421 of the upper ball bearing 42 is in contact with a lower surface of an upper shaft protrusion 315 of the shaft main body 311. Therefore, the inner ring 421 of the upper ball bearing 42 is vertically fixed with respect to the shaft main body 311. The upper shaft protrusion 315 projects radially outward of an inner peripheral edge of the upper ball bearing 42, on an upper side of the upper ball bearing 42. In the example illustrated in FIG. 4, the upper shaft protrusion 315 is a stepped portion connected to a portion surrounding the upper shaft protrusion 315, of the shaft main body 311. Moreover, the upper shaft protrusion 315 is a C-ring attached to a portion radially inward of the upper shaft protrusion 315, of the shaft main body 311. Alternatively, the inner ring 421 of the upper ball bearing 42 may be vertically fixed with respect to the shaft main body 311 by press-fitting the inner ring 421 into the shaft main body 311. In this case, the upper shaft protrusion 315 may not be provided.

A lower surface of the outer ring 422 of the upper ball bearing 42 is in contact with an elastic member 43. The elastic member 43 is in contact with an upper surface of the cylindrical center portion 291. Therefore, the lower surface of the outer ring 422 of the upper ball bearing 42 is vertically supported by the cylindrical portion 212 via the elastic member 43. The elastic member 43 is substantially annular with the center axis J1 as a center. The elastic member 43 may be a substantially circular arc such as a C shape in a plan view. The elastic member 43 is, for example, a thin plate spring. In this embodiment, a wave washer is used as the elastic member 43.

In the motor 1, the shaft main body 311 moves slightly downward by fastening the nut 312. The upper ball bearing 42 is pushed downward by the upper shaft protrusion 315 and moves downward together with the shaft main body 311. The elastic member is pressed downward by the upper ball bearing 42 to be elastically deformed, and is vertically compressed. Furthermore, the lower ball bearing 41 is pushed downward by the lower shaft protrusion 314 and is sandwiched by the nut 312, the lower bracket protrusion 292 and the lower shaft protrusion 314. Therefore, a vertically relative position of the lower ball bearing 41 with respect to the shaft 31 is accurately secured.

The upper surface of the outer ring 412 of the lower ball bearing 41 does not have to be in contact with the lower surface of the cylindrical center portion 291. Moreover, the elastic member 43, which is in contact with the lower surface of the outer ring 422 of the upper ball bearing 42, does not have to be in contact with the upper surface of the cylindrical center portion 291.

For example, an inner diameter of the cylindrical center portion 291 may be approximately the same as those of the portions on the lower and upper sides of the cylindrical center portion 291. A substantially cylindrical collar, which is a member different from the cylindrical center portion 291, may be fixed to an inner peripheral surface of the cylindrical center portion 291. The collar is made of, for example, metal or resin. A vertical height of the collar is approximately the same as a vertical height of the cylindrical center portion 291. In this case, the upper surface of the outer ring 412 of the lower ball bearing 41 is in contact with a lower surface of the collar of the cylindrical portion 212. Moreover, the lower surface of the outer ring 422 of the upper ball bearing 42 is in contact with an upper surface of the collar via the elastic member 43. Therefore, the upper surface of the outer ring 412 of the lower ball bearing 41 is vertically supported by the cylindrical portion 212. The lower surface of the outer ring 422 of the upper ball bearing 42 is vertically supported by the cylindrical portion 212 via the elastic member 43.

Alternatively, the inner diameter of the cylindrical center portion 291 may be approximately the same as those of the portions on the lower and upper sides of the cylindrical center portion 291. Two C-rings, which are members different from the cylindrical center portion 291, may be fixed to the inner peripheral surface of the cylindrical center portion 291. One C-ring is disposed at a lower end of the cylindrical center portion 291, and the other C-ring is disposed at an upper end of the cylindrical center portion 291. In this case, the upper surface of the outer ring 412 of the lower ball bearing 41 is in contact with a lower surface of the one C-ring. Moreover, a lower surface of the outer ring 422 of the upper ball bearing 42 is in contact with an upper surface of the other C-ring via the elastic member 43. Therefore, the upper surface of the outer ring 412 of the lower ball bearing 41 is vertically supported by the cylindrical portion 212. Furthermore, the lower surface of the outer ring 422 of the upper ball bearing 42 is vertically supported by the cylindrical portion 212 via the elastic member 43.

The shaft 31 further includes a shaft flange portion 316. The shaft flange portion 316 extends radially outward from an upper portion of the shaft main body 311. The shaft flange portion 316 is a substantially annular plate-like portion centered on the center axis J1. The shaft flange portion 316 is disposed upward away from the upper ball bearing 42. The shaft flange portion 316 and the shaft main body 311 are a single member made of metal.

A male screw portion 317 is provided at an upper end portion of the shaft main body 311. The male screw portion 317 is disposed higher than the shaft flange portion 316. The impeller of the axial flow fan, for example, is attached to the male screw portion 317.

Figure 9:
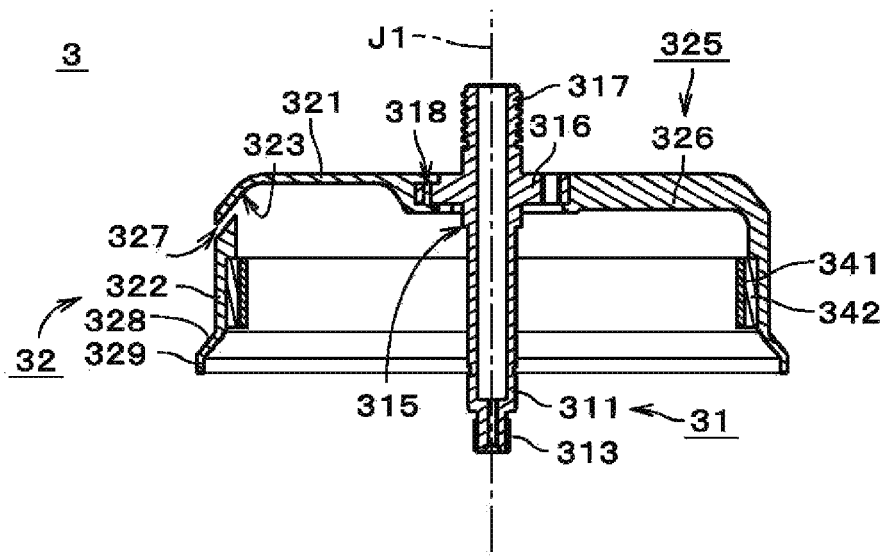
FIG. 9 is a longitudinal cross-sectional view of a shaft and a rotor.
Figure 10:
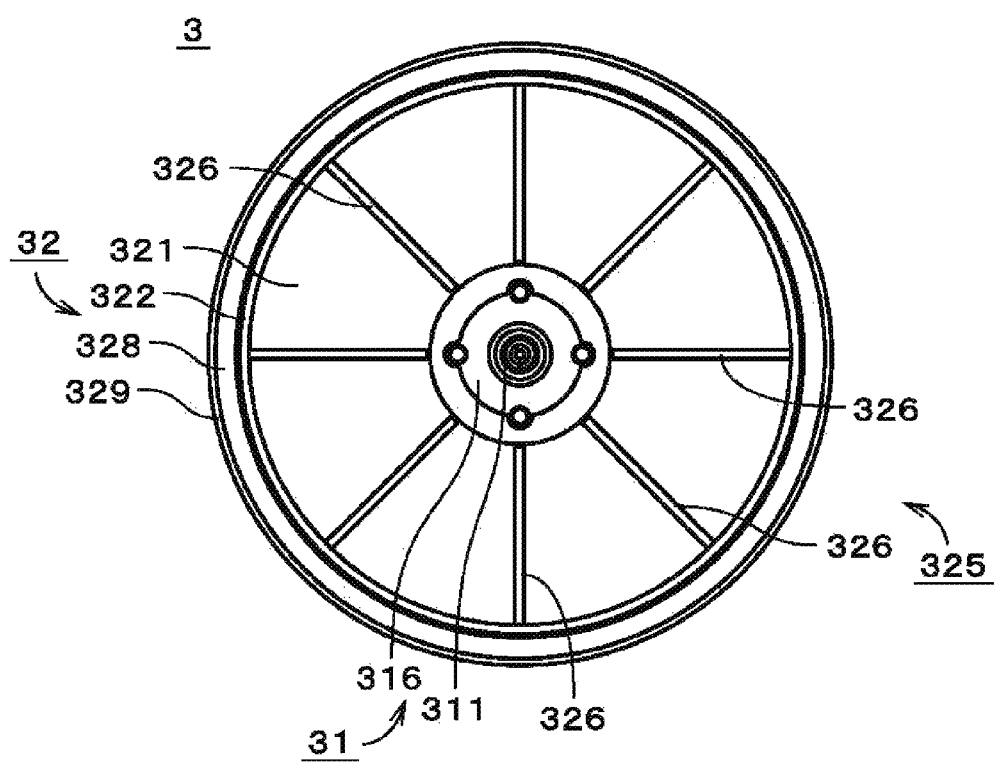
FIG. 10 is a bottom view of the shaft and the rotor.

FIG. 9 shows longitudinal cross-sectional views of the shaft 31 and the rotor 32. FIG. 10 shows bottom views of the shaft 31 and the rotor 32. The rotor 32 is connected to the shaft 31. The rotor 32 is a substantially cylindrical covered member centered on the center axis J1. The rotor 32 opens downward.

The rotor 32 includes a rotor lid portion 321, a rotor side wall portion 322, a rotor magnet 341, a rotor yoke 342, a blower plate portion 325, a rotor enlarged diameter portion 328, and a lower rotor wall portion 329. The rotor lid portion 321 is connected to the shaft 31. The rotor lid portion 321 is a substantially disk-like portion centered on the center axis J1. The rotor side wall portion 322 extends downward from an outer edge portion of the rotor lid portion 321. The rotor side wall portion 322 is a substantially cylindrical portion centered on the center axis J1. An inner surface 323 of a connecting portion between the rotor lid portion 321 and the rotor side wall portion 322 is an inclined surface that goes downward as going radially outward.

The rotor enlarged diameter portion 328 extends radially outward and downward from a lower end portion of the rotor side wall portion 322. An inner peripheral surface and an outer peripheral surface of the rotor enlarged diameter portion 328 are respectively side surfaces of a substantially circular truncated cone, which is centered on the center axis J1. The lower rotor wall portion 329 extends downward from an outer peripheral portion of the rotor enlarged diameter portion 328. The lower rotor wall portion 329 is a substantially cylindrical portion centered on the center axis J1. The lower rotor wall portion 329 has an inner diameter larger than an outer diameter of the bracket side wall portion 213. In the example illustrated in FIG. 4, an inner peripheral surface of the lower rotor wall portion 329 is radially opposed to an outer peripheral surface of the bracket side wall portion 213. Moreover, an upper end of the bracket side wall portion 213 is vertically opposed to the rotor enlarged diameter portion 328.

As shown in FIGS. 9 and 10, the blower plate portion 325 is connected to a lower surface of the rotor lid portion 321. The blower plate portion 325 extends radially outward from a radial center portion of the rotor lid portion 321. The blower plate portion 325 includes a plurality of blower plates 326. The plurality of blower plates 326 are radially arranged with the center axis J1 as a center on the lower surface of the rotor lid portion 321.

Each blower plate 326 is a substantially flat plate-like portion extending radially outward from the radial center portion of the rotor lid portion 321. The radial center portion of the rotor lid portion 321 is, for example, a portion disposed inside an upper end outer peripheral edge of the cylindrical portion 212 of the bracket 21 in a plan view. Each blower plate 326 extends substantially linearly in parallel to the radial direction in a plan view. Furthermore, each blower plate 326 is substantially linear symmetrical about a center line extending in the radial direction through a center of the blower plate 326 in a plan view. A lower end edge of each blower plate 326 extends in substantially parallel to a horizontal direction. The plurality of blower plates 326 are arranged at substantially equal angular intervals in the peripheral direction.

In the example illustrated in FIG. 10, the blower plate portion 325 includes eight blower plates 326. In FIG. 9, a cross-section including the blower plate 326 is drawn on a right side of the center axis J1, and a cross-section not including the blower plate 326 is drawn on a left side of the center axis J1. FIG. 4 is also drawn in the same manner. The numbers, shapes, arrangement and the like of the blower plates 326 may be appropriately tailored. For example, the blower plate 326 may extend in a direction inclined with respect to the radial direction in a plan view. Moreover, the number of the blower plates 326 included in the blower plate portion 325 may be one, or two or more.

As shown on the left side of FIG. 9, an outlet 327 radially penetrating the rotor 32 is provided in the motor 1. The outlet 327 is disposed radially outward of the blower plate portion 325. In the example illustrated in FIG. 9, the outlet 327 is disposed on the rotor side wall portion 322 and radially penetrates the rotor side wall portion 322. The outlet 327 is disposed higher than the rotor magnet 341.

In the examples illustrated in FIGS. 1 to 3, eight outlets 327 are provided in the rotor 32. The eight outlets 327 are arranged at substantially equal angular intervals in the peripheral direction, at substantially the same position in the vertical direction. Each outlet 327 is disposed at a peripheral position between two blower plates 326 adjacent in the peripheral direction. An opening of a radial outer end portion of each outlet 327 is substantially belt-shaped extending in the peripheral direction. The numbers, shapes, sizes and positions of the outlets 327 provided in the rotor 32 may be appropriately tailored. For example, the number of the outlets 327 provided in the rotor 32 may be one, or two or more.

In the example illustrated in FIG. 9, the outlet 327 goes downward as going radially outward. A radial inner end portion of the outlet 327 is disposed lower than the inner surface 323 of the connecting portion between the rotor lid portion 321 and the rotor side wall portion 322. An upper end of the radial outer end portion of the outlet 327 is disposed lower than a lower end of the radial inner end portion of the outlet 327.

An inclined angle of the outlet 327 with respect to the horizontal direction is substantially the same as an inclined angle of the outer peripheral surface of the rotor enlarged diameter portion 328 with respect to the horizontal direction. In this embodiment, the inclined angle is about 40 degrees. The inclined angle of the outlet 327 with respect to the horizontal direction is an acute angle formed by a cross-section of a lower surface of the outlet 327 and a lateral direction in FIG. 9. The inclined angle of the outer peripheral surface of the rotor enlarged diameter portion 328 with respect to the horizontal direction is an acute angle formed by a cross-section of the outer peripheral surface and the lateral direction in FIG. 9. It does not matter as long as the inclined angle of the outer peripheral surface of the rotor enlarged diameter portion 328 with respect to the horizontal direction is equal to or larger than the inclined angle of the outlet 327 with respect to the horizontal direction.

The rotor magnet 341 is fixed to an inner peripheral surface of the rotor side wall portion 322. The rotor magnet 341 includes a plurality of magnetic poles arranged in the peripheral direction. The rotor magnet 341 is radially opposed to the armature 22 radially outward of the armature 22. In the example illustrated in FIG. 9, the rotor yoke 342 is disposed between the rotor magnet 341 and the rotor side wall portion 322. In other words, the rotor magnet 341 is indirectly fixed to the inner peripheral surface of the rotor side wall portion 322 via the rotor yoke 342. The rotor yoke 342 is made of metal. The rotor yoke 342 is a substantially cylindrical member centered on the center axis J1. Alternatively, the rotor yoke 342 may be excluded and the rotor magnet 341 may be directly fixed to the inner peripheral surface of the rotor side wall portion 322, in the motor 1.

In the example illustrated in FIG. 9, the rotor lid portion 321, the rotor side wall portion 322, the rotor enlarged diameter portion 328, the lower rotor wall portion 329 and the blower plate portion 325 are a single member made of resin. Moreover, the rotor lid portion 321, the rotor side wall portion 322, the rotor enlarged diameter portion 328, the lower rotor wall portion 329 and the blower plate portion 325 are integrally formed with the shaft 31 by the insert molding. The shaft flange portion 316 is held by the radial center portion of the rotor lid portion 321. Preferably, the rotor lid portion 321 covers upper, side and lower surfaces of the shaft flange portion 316. In particular, the rotor lid portion 321 covers at least a part of the upper surface of the shaft flange portion 316, at least a part of the side surface, and at least a part of the lower surface.

The shaft flange portion 316 is provided with a through-hole 318 penetrating in the axial direction. The through-hole 318 is filled with the resin connected to the rotor lid portion 321. A portion covering the upper surface of the shaft flange portion 316, of the rotor lid portion 321, and a portion covering the lower surface of the shaft flange portion 316, of the rotor lid portion 321, are connected to each other by the resin within the through-hole 318. In other words, portions sandwiching the shaft flange portion 316 in the vertical direction, of the rotor lid portion 321 are continuous via the through-hole 318.

As shown in FIGS. 3 to 7, the motor 1 is provided with a plurality of inlets 217 penetrating the bracket 21. The plurality of inlets 217 are respectively through-holes vertically penetrating the bracket bottom portion 211. Each inlet 217 is disposed radially outward of the cylindrical portion 212 of the bracket 21. Each inlet 217 is substantially arcuate with the center axis J1 as a center. At least a part of the inlets 217, out of the plurality of inlets 217, are disposed vertically below the armature 22. The bus bar unit 26 (described above) is disposed between at least a part of the inlets 217 and the armature 22 in the vertical direction. Moreover, the numbers, shapes, sizes and positions of the inlets 217 provided in the bracket 21 may be appropriately tailored. For example, the number of the inlets 217 provided in the bracket 21 may be one, or two or more.

In the motor 1, a current is supplied to the coil 224 via the terminal 242 and the bus bar unit 26, whereby a torque is generated between the coil 224 and the rotor magnet 341. Therefore, the rotating portion 3 (that is, the shaft 31 and the rotor 32) rotates around the center axis J1. The rotating portion 3 is rotatable in both a clockwise direction and a counterclockwise direction in a plan view. In the motor 1, a peripheral position of the magnetic pole of the rotating rotor magnet 341 is detected by the Hall element 271 (described above). Hereinafter, detection of the peripheral position of the magnetic pole of the rotor magnet 341 is simply referred to as positional detection of the rotor magnet 341. In this case, a position of the rotor magnet 341 is a rotational position in the peripheral direction.

In the motor 1, the air in the vicinity of the rotor lid portion 321, below the rotor lid portion 321, flows radially outward by rotating the blower plate portion 325 of the rotor 32, and thus is discharged from the outlet 327 of the rotor side wall portion 322 to the outside of the motor 1. Moreover, the air flows into the motor 1 from the inlet 217 of the bracket bottom portion 211, and then flows upwardly toward the blower plate portion 325 within the motor 1. Therefore, the air flow from the inlet 217 to the outlet 327 via the vicinity of the blower plate portion 325 is formed within the motor 1. Consequently, an inner structure of the motor 1 is cooled. The blower plate portion 325 is a cooling fan for cooling the inside of the motor 1. Furthermore, the inlet 217 is an opening through which the air flows into the motor 1, and the outlet 327 is an opening through which the air inside the motor 1 flows out.

Figure 11:
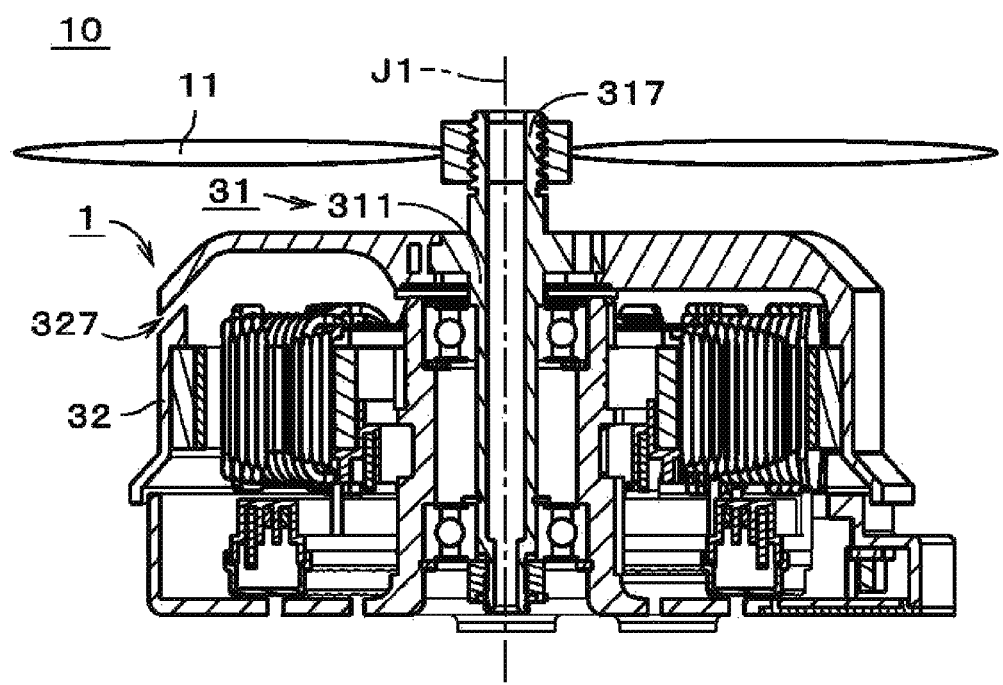
FIG. 11 is a cross-sectional view of an axial flow fan.

FIG. 11 is a cross-sectional view illustrating the axial flow fan 10 using the motor 1 described above. The axial flow fan 10 includes the motor 1 and an impeller 11. The impeller 11 is attached to an upper end portion of the shaft 31 above the rotor 32. In particular, the impeller 11 is attached to the male screw portion 317 of the upper end portion of the shaft main body 311. The impeller 11, for example, sends wind downward from an upper side of the rotor 32.

As described above, the motor 1 includes the shaft 31, the bearing mechanism 4, the armature 22, the bracket 21, and the rotor 32. The shaft 31 is centered on the center axis J1 oriented in the vertical direction. The bearing mechanism 4 rotatably supports the shaft 31. The armature 22 is disposed radially outward of the bearing mechanism 4. The bearing mechanism 4 and the armature 22 are fixed to the bracket 21. The rotor 32 is a covered cylindrical rotor and is connected to the shaft 31.

The rotor 32 includes the rotor lid portion 321 and the rotor side wall portion 322. The rotor lid portion 321 has a disk-like shape and is connected to the shaft 31. The rotor side wall portion 322 extend downward from an outer peripheral portion of the rotor lid portion 321. The shaft 31 is made of metal. The rotor lid portion 321 and the rotor side wall portion 322 are made of resin. The rotor lid portion 321 and the shaft 31 are an integrally molded article. Therefore, the rotor 32 and the motor 1 can be light-weighted. The rotor 32 and the shaft 31 can be further securely fixed. Consequently, it is possible to prevent the rotor lid portion 321 from being detached from the shaft flange portion 316.

As described above, the shaft 31 includes the shaft flange portion 316 extending radially outward. The rotor lid portion 321 covers upper, side and lower surfaces of the shaft flange portion 316. Accordingly, the rotor 32 and the shaft 31 can be further securely fixed.

The rotor 32 further includes the rotor magnet 341. The rotor magnet 341 is directly or indirectly fixed to the inner peripheral surface of the rotor side wall portion 322. The rotor magnet 341 is radially opposed to the armature 22 radially outward of the armature 22. Accordingly, it is possible to provide the motor 1 which is a light-weighted external rotor motor.

Moreover, the rotor 32 further includes the rotor yoke 342 disposed between the rotor magnet 341 and the rotor side wall portion 322. Accordingly, even when the rotor side wall portion 322 is made of resin, it is possible to prevent the performance of the motor 1 from deteriorating.

The rotor 32 further includes a blower plate portion 325. The blower plate portion 325 is connected to a lower surface of the rotor lid portion 321. The blower plate portion 325 extends radially outward from a center portion of the rotor lid portion 321. The motor 1 is provided with the inlet 217 and the outlet 327. The inlet 217 penetrates the bracket 21. The outlet 327 is disposed radially outward of the blower plate portion 325 and radially penetrates the rotor 32. In the motor 1, the air flow from the inlet 217 to the outlet 327 via the vicinity of the blower plate portion 325 is formed within the motor 1 by rotating the blower plate portion 325 around the center axis J1. Accordingly, the internal structure of the motor 1 can be appropriately cooled.

As described above, the shaft flange portion 316 includes the through-hole 318 penetrating in the axial direction. The through-hole 318 is filled with resin. Accordingly, the rotor 32 and the shaft 31 can be further securely fixed.

The motor 1 stated above can be modified in various ways.

The shaft flange portion 316 does not have to provide with the through-hole 318 penetrating in the axial direction. Moreover, the rotor lid portion 321 does not have to cover all of the upper, side and lower surfaces of the shaft flange portion 316. For example, the rotor lid portion 321 may cover the side and lower surfaces of the shaft flange portion 316.

The shaft flange portion 316 may not be provided in the shaft flange portion 316 in the motor 1. Moreover, the inlet 217, the outlet 327 and the blower plate portion 325 may not be provided in the motor 1.

The shapes, structures and materials of the bracket 21, the shaft 31 and the rotor 32 in the rotor 1 may be modified in various manners. The motor 1 is not limited to the three-phase motor, but may be various types of motors. The motor 1 may be employed in various devices other than axial flow fan 10.

The motor according to the prevent disclosure can be used as a motor for various purposes. The motor is, for example, used for the axial flow fan.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor comprising:
   a shaft centered on a center axis oriented in a vertical direction;
   a bearing rotatably supporting the shaft;
   an armature disposed radially outward of the bearing;
   a bracket to which the bearing and the armature are fixed; and
   a covered cylindrical rotor connected to the shaft; wherein
   the rotor includes:
      a disk-shaped rotor lid portion connected to the shaft; and
      a rotor side wall portion extending downward from an outer edge of the rotor lid portion;
   the shaft is made of metal;
   the rotor lid portion and the rotor side wall portion are made of resin;
   the rotor lid portion and the shaft are an integrally molded article;
   the shaft includes a shaft flange portion extending radially outward from other portions of the shaft;
   the rotor lid portion covers upper, side, and lower surfaces of the shaft flange portion;
   the shaft flange portion is provided with a through-hole penetrating in an axial direction; and
   the through-hole is filled with resin.

2. The motor according to claim 1, wherein
   the rotor further includes a blower plate portion connected to a lower surface of the rotor lid portion and extending radially outward from a center portion of the rotor lid portion; and
   the motor further comprises:
      an inlet penetrating the bracket; and
      an outlet disposed radially outward of the blower plate portion and radially penetrating the rotor.

3. The motor according to claim 1, wherein
   the rotor further includes a rotor magnet directly or indirectly fixed to an inner peripheral surface of the rotor side wall portion; and
   the rotor magnet is radially opposed to the armature at a radially outer side of the armature.

4. The motor according to claim 3, wherein the rotor further includes a rotor yoke disposed between the rotor magnet and the rotor side wall portion.

* * * * *